United States Patent Office 3,031,998
Patented May 1, 1962

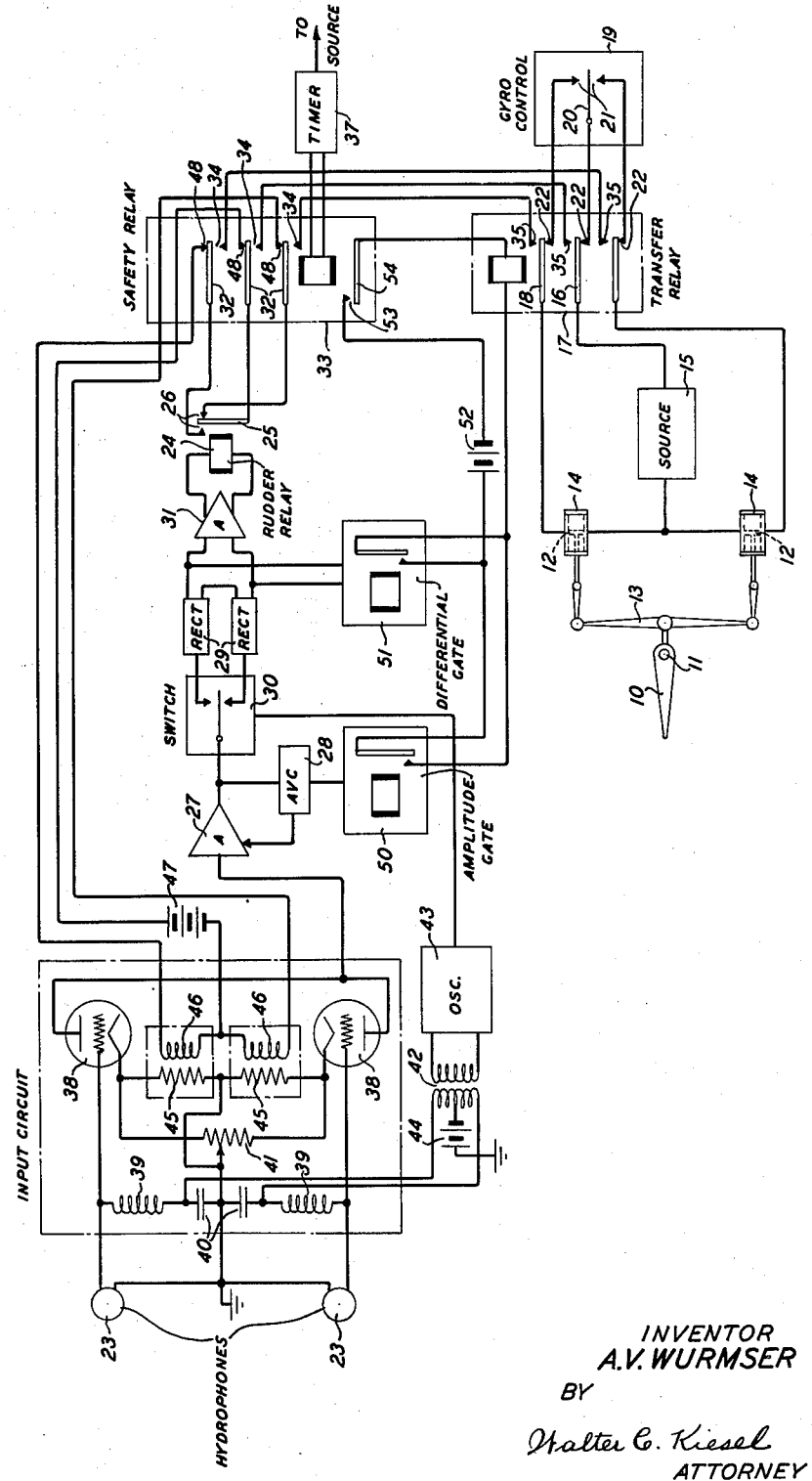

3,031,998
TORPEDO CONTROL CIRCUIT
Alphons V. Wurmser, Bogota, N.J., assignor to Bell Telephone Laboratories, Incorporated, New York, N.Y., a corporation of New York
Filed Aug. 11, 1944, Ser. No. 549,003
7 Claims. (Cl. 114—23)

This invention relates to control circuits and more particularly to steering systems for sonically guided torpedoes of the type disclosed in the application Serial No. 545,835, filed July 20, 1944, of Alton C. Dickieson.

Steering systems of the type disclosed in the above-identified application comprise, in general, a rudder, an actuating element therefor, a gyroscope control element and a signal actuated control element energized in accordance with signals emanating from the target and effective to produce a control signal related in polarity and amplitude to the bearing of the target, such as a ship, with respect to the torpedo. Normally, the gyroscope element is associated operatively with the rudder actuating element and the signal control element is disassociated therefrom. A gate system, which may be time controlled or controlled in accordance with the target signal, is provided for associating the signal control element with the rudder actuating element and disassociating the gyroscope control element therefrom. For a period after the torpedo is launched, the rudder is under control of the gyroscope whereby the torpedo is maintained upon a preset course. Upon operation of the gate system, as when the torpedo has passed beyond the effective signal field of the launching vessel or when it has entered the effective signal field of the target, the rudder is transferred from gyroscope to target signal control.

The signal control element comprises, generally, a pair of similar signal channels each of which includes a hydrophone as the input element therefor, the two hydrophones being mounted on opposite sides, e.g. port and starboard, of the torpedo whereby the relative response thereof is a function of the direction of the source of the signals received by the hydrophones, with respect to the longitudinal axis of the torpedo. The outputs of the two channels are resolved in difference relation to produce a signal in accordance with the polarity of which the rudder actuating element is controlled to effect deflection of the rudder in one direction or the other.

As pointed out in detail in the aforementioned application, the effective range and other characteristics of the signal control element are dependent to a marked extent upon the degree of balance existing between the two signal channels at the time of operation of the gate system to transfer the rudder from gyroscope to target signal control. Also, as disclosed in that application, means may be provided for accurately balancing the two channels, as upon torpedo self noise and random submarine noise, prior to operation of the gate system.

One general object of this invention is to improve and more specifically to simplify balancing apparatus for a pair of similar signal channels in a signal actuated control system of the general type described above.

In accordance with one feature of this invention, the balancing apparatus comprises a pair of similar resistors having a high temperature coefficient of resistance, each resistor being connected in a respective signal channel, as adjacent the input end thereof, heaters for the resistors, individual energizing circuits for the heaters and means actuated in accordance with the control signal obtained from the signal control system for a period before the rudder is transferred to control by this system, for controlling the heater energizing circuits. During this period, the rudder is under gyroscope control and, thus, the torpedo is directed along a substantially straight path. For a part of this period, the hydrophones receive signals corresponding to sounds emanating from the launching vessel but after the torpedo has traveled a substantial distance from the vessel and has not yet entered the effective signal field of the target, the signals received by the hydrophones are composed primarily of torpedo self noise and random submarine noise. If the two signal channels are not balanced, the signal control system will resolve the outputs of the two channels into a control signal of one polarity or the other. The heater circuits for the balancing resistors are closed accordingly so that the resistors are adjusted thermally until the two channels are substantially balanced on random and self noise, whereby at the time the rudder is transferred to target signal control, the signal control system is conditioned for maximum range and optimum operation. Means are provided for disabling the energizing circuits for the resistor heaters before or at the time the rudder is transferred to signal control so that thereafter the steering system is conditioned for operation in accordance with signals emanating from the target.

The invention and the above-noted and other features thereof will be understood more clearly and fully from the following detailed description with reference to the accompanying drawing in which:

The single figure is a circuit diagram, partly in functional schematic form, of a steering system illustrative of one embodiment of this invention.

Referring now to the drawing, the steering system illustrated therein comprises a rudder 10 pivoted at 11 and adapted to be deflected in one direction or the other by a pair of magnetic armatures 12 coupled to the rudder by a suitable linkage 13 and each associated with a respective solenoid 14. The solenoids are arranged for energization by a source 15, such as a battery, connected between one end of each solenoid and the armature 16 of a transfer relay designated 17 as a whole. The energizing circuits for the solenoids 14 are arranged to be closed over the respective armatures 18 of the transfer relay. As is apparent, when the circuit for one solenoid is closed, the rudder is deflected in one direction and when the other solenoid is energized, the rudder is deflected in the opposite direction.

The solenoid energizing circuits are controlled by either a gyroscope control element, designated generally as 19, or by a submarine signal actuated system. The gyroscope control is of known construction and need not be described in detail here. Suffice it to say that it includes a transfer switch or relay including an armature 20 and transfer contacts 21 and functions to cause the armature 20 to engage one or the other of the contacts 21 in accordance with the direction of the departure of the torpedo from a preset course, whereby one or the other of the solenoids 14 is energized and the rudder 10 is deflected accordingly to maintain the torpedo on course. As shown in the drawing, the armature 20 and contacts 21 are connected directly to respective contacts 22 normally engaged by the armatures 16 and 18.

The submarine signal actuated control system may be generally of the construction described in detail in the application Serial No. 491,795, filed June 22, 1943, of Donald D. Robertson and comprises a pair of similar hydrophones 23 mounted symmetrically on opposite sides, e.g. port and starboard, of the torpedo, and a rudder relay 24 having an armature 25 and a pair of transfer contacts 26, one of which may be engaged normally by the armature. The hydrophones 23 are connected in alternation to an amplifier 27 by way of an input circuit described in detail hereinafter, the amplifier being provided with automatic gain control 28 and the output thereof being supplied in alternation and in synchronism with the alternate connection of the hydrophone to the amplifier, to a pair of similar rectifiers 29 by way of a switch 30. The rectifier outputs are combined in difference relation and the resultant signal is impressed upon the input circuit of a direct current amplifier 31 normally biased at cutoff and including the relay 24 in its output circuit. As will be seen, the signal control system comprises, in effect, two similar signal channels, each including one of the hydrophones, a portion of the input element, the amplifier 27 and a respective one of the rectifiers 29, and the relay 24 is actuated to close one or the other of the contacts 26 in accordance with the polarity of the differentially combined outputs of the two channels.

The armature 25 and contacts 26 of the rudder relay 24 are connected to respective armatures 32 of a safety relay 33, each of these armatures having associated therewith a contact 34 connected to a respective contact 35 of the transfer relay, and having associated therewith also other contacts 48 the function of which will be pointed out hereinafter. The relay 33 is energized from a source, not shown, the energizing circuit being controlled by a timer 37 set to close the circuit at a preassigned time after the torpedo is launched, for instance at the end of a period after the launching of the torpedo sufficient to allow the torpedo to travel beyond the effective signal field of the launching vessel.

The transfer relay 17 is energized over a circuit, described hereinafter, when the torpedo comes within the signal field of the target and when energized disengages the armatures 16 and 18 from the associated contacts 22 and brings them into engagement with the respective contacts 35, so that, as will be apparent, when the safety and transfer relays have operated, the energizing circuits for the solenoids 14 are under control of the rudder relay 24.

Briefly, the operation of the system, disregarding for the moment the automatic balancing apparatus, is as follows: When the torpedo is launched, the circuits are in the condition shown so that the solenoids 14 are associated with the gyroscope control 19 and are disassociated from the signal actuated control system. Hence, the rudder is under control of the gyroscope control 19 and the torpedo is maintained on a prescribed course. When the torpedo has traveled beyond the effective signal field of the launching vessel and has entered the effective signal field of the target, the safety and transfer relays 33 and 17, respectively, have operated so that the gyroscope control 19 is disassociated from the solenoids 14 and the latter are placed under control of the rudder relay 24. Thenceforth, the rudder is deflected in accordance with the relative outputs of the signal channels and inasmuch as the relation of these outputs is depending upon the direction of the target with respect to the torpedo, the rudder is deflected to guide the torpedo to the target.

As pointed out in detail in the aforementioned application of Alton C. Dickieson, it is highly advantageous that at the time the rudder is transferred from gyroscope control to control in accordance with target signals, the two channels of the signal control system be in substantially exact balance, that is, that electrical dissymmetries in the two channels be compensated for such that at this time the differential signal applied to the amplifier 31, assuming no target signal at the hydrophones 23, is substantially zero. In accordance with one feature of this invention, such balance is obtained in an expeditious manner.

The input element by way of which the hydrophones 23 are associated operatively in alternation with the amplifier 27 comprises a pair of similar electron discharge devices 38 the anodes of which are connected together and to the input side of the amplifier. The input circuit for each device 38 includes one of the hydrophones 23 bridged by an inductance 39 and condenser 40 in series, and a portion of a potentiometer resistance 41 which may be adjusted to establish approximate balance between the two channels in the manufacture of the system or may be adjusted to establish a prescribed unbalance between the two channels as described in the application Serial No. 549,001, filed August 11, 1944, of Alton C. Dickieson, now U.S. Patent No. 2,997,971. Bridged across the two condensers 40 is the secondary winding of a transformer 42 the primary winding of which is connected to an alternating current source such as an oscillator 43. The mid-point of the secondary winding of the transformer 42 is connected to ground and thence to the cathodes of the device 38 by way of a direct current source, such as a battery 44, of such potential as to bias the two devices beyond cut-off. The oscillator 43 impresses upon the input circuits of the devices 38 a potential sufficient to overcome the blocking bias due to the source 44 so that the two devices are rendered conductive in alternation whereby the hydrophones 23 are operatively connected in alternation to the input of the amplifier 27. As indicated in the drawing, the oscillator 43 also controls the switch 30 so that the output of the amplifier 27 is supplied to the two rectifiers alternately and in synchronism with the alternate association of the hydrophones with the amplifier.

Associated with input circuits of the devices 38 are substantially identical, indirectly heated balancing elements each of which comprises a resistor 45, advantageously large in comparison to the potentiometer resistance 41, having a high temperature coefficient of resistance and bridged across a respective part of the potentiometer resistance 41, and a heater 46. The two heaters 46 have one end connected in common to a source 47, such as a battery, which is connected to a contact 48 normally engaged by an armature 32 of the safety relay. The other ends of the heaters 46 are connected to other contacts 48 of the safety relay, as shown, each normally engaged by the respective armature. Thus, as will be apparent, the energizing circuits for the heaters 46 are controlled by the rudder relay 24 and, hence, in accordance with the polarity of the difference potential from the rectifiers 29 impressed upon the input circuit of the direct current amplifier 31.

The resistance of each resistor 45 is determined, of course, by its temperature and its temperature in turn is determined by the period for which the energizing circuit for the associated heater 46 is closed. It will be apparent that if the two signal channels were in perfect balance and no signals or signals of equal intensity were being received by the hydrophones, the armature 25 would engage the contacts 26 for equal periods so that the two resistors 45 would be heated to the same temperature and have the same resistance so that the channels would remain balanced. In actual practice, exact initial balance of the two channels is difficult to obtain and dissymmetries may be present due, for example, to differences between the two devices 38, the rectifiers 29 and other elements of the system. Also, when the torpedo is in operation, self noises due to such elements as the propeller, the relay 24, and the propulsion machinery are generated and these noises may be of such directional character that their effects upon the two hydrophones are unequal. Also, random submarine noises may be received by the hydrophones and these noises may have an effective direction other than parallel to the torpedo axis. Thus, it will be appreciated that the signal actuated system may be actuated falsely as a steering control element when the torpedo is transferred from gyroscope to signal control.

If the two channels are unbalanced due to dissymmetries therein or to random or torpedo self noise, it will be seen that the relay 24 will be actuated accordingly and will close the energizing circuit for one heater 46 longer than that for the other. Hence, the two resistors will be heated unequally proportionately to the unbalance and the resistors 45 will be adjusted accordingly to alter the impedances of the two channels to compensate for this unbalance whereby at the time the torpedo is committed to target signal control the signal actuated system is balanced on random and torpedo self noise and the differential signal applied to the amplifier 31 is accurately proportional to the difference in target signal intensities at the two hydrophones 23 and, therefore, to the direction of the target with respect to the torpedo.

When the torpedo is launched from a vessel, the hydrophones may receive signals emanating from this vessel and the relay 24 may be operated accordingly if the effective direction of such signals is other than parallel to the longitudinal axis of the torpedo. However, as the torpedo moves away from the vessel the intensity of such signals decreases rapidly so that for the latter portion of the torpedo run under gyroscope control, the signals received by the hydrophones 23 are those due to self noise and random submarine noise and the two signal channels, therefore, are balanced on such noise. Of course, the timer 37 should be set so that the relay 33 will not operate to disable the energizing circuits for the heaters 46 until the torpedo, after launching, has traveled sufficiently beyond the effective signal field of the launching vessel to allow balancing of the two channels on self and random noise.

Advantageously, the heating characteristics of the balancing resistors and associated heaters are made such that the effects due to short time unbalances are averaged. Also, it is advantageous that the balancing elements be slow-cooling so that the two channels remain balanced on self and random noise for a substantial interval after the energizing circuits for the heaters 46 are disabled by operation of the timer 37. Thus, if the timer operates at some time before the torpedo is committed to target signal control by the transfer relay and before the torpedo has entered the effective signal field of the target, the two channels will remain substantially balanced at least until the torpedo enters this field.

As has been mentioned heretofore, the transfer relay 17 may be controlled in accordance with the target signals. Advantageously, the control is effected by a dual gate system including two elements, one actuated in accordance with the signal level at the hydrophones 23 and the other actuated in accordance with the difference in the signal amplitudes at the two hydrophones. In one form, illustrated in the drawing, the gate system includes an amplitude gate relay 50 energized from the automatic gain control 28 and a differential gate relay 51 energized in accordance with the difference between the outputs of the rectifiers 29. Both gate relays have their contacts open normally. The gate relay 50 is set so that it will operate to close its contact only when the signal at the automatic gain control 28 is of at least a preassigned amplitude so that, as will be apparent, this relay 50 will operate only when the signals at the hydrophones are of at least a preassigned intensity. The relay 51 similarly is set to operate only when the difference between the outputs of the rectifiers is of at least a preassigned magnitude so that, as will be apparent, this relay is controlled in accordance with the difference in signal amplitudes at the two hydrophones. Advantageously, the amplitude gate relay 50 is made less sensitive than the differential gate relay 51.

The contacts of the relays 50 and 51 are connected in parallel in the energizing circuit for the transfer relay 17, this circuit including a source 52, such as a battery, and the contact 53 and armature 54 of the safety relay 33. Thus, the transfer relay 17 cannot operate to transfer the torpedo from gyroscope to target signal control until after the safety relay 33 has operated and one or the other, or both, of the gate relays operates.

The operation of the gate system will be understood from the following considerations. When the relay 33 operates, the steering system is conditioned for target signal control. If at this time the torpedo is within the target signal field either the differential gate 51 or amplitude gate 50, or both, will operate to cause operation of the transfer relay to transfer the torpedo from gyroscope to signal control. At this time, the target signal level at the hydrophones may be insufficient to result in operation of the relay 50 yet the torpedo may be on such course that the relay 51 may be caused to operate. When the latter operates, the transfer relay operates so that the solenoids 14 are controlled in accordance with the operation of the rudder relay 24 and the rudder 10 is deflected to steer the torpedo to bring it on course toward the target. When the torpedo is on course, the relay 51 releases so that, assuming the relay 50 has not been caused to operate, the transfer relay 17 releases and the torpedo is returned to gyroscope control. This sequence of operations may be repeated several times until the torpedo comes into sufficient proximity to the target to result in operation of the amplitude gate relay 50 whereby the torpedo is subjected to target signal control. If desired, a slow-to-operate lockup may be provided in association with the relay 50 to commit the torpedo to control solely in accordance with target signals whenever this relay is energized continuously for a prescribed interval or a preassigned portion of a prescribed interval.

The possibility exists that at the time the relay 33 operates the torpedo may be beyond the effective signal field of the target. In such case, the rudder may be actuated by extraneous noises such as, for example, noise due to gun fire or shells falling into the sea. Such noises may be directive but are intermittent. Thus, the relay 51 may operate to cause operation of the relay 17 and transfer the torpedo to control in accordance with such noises. However, inasmuch as such noises are intermittent, the rudder will be alternately under signal and gyro control, or if the noises cease, will revert to gyroscope control and proceed on the course determined by the last noise pulse. Only when the torpedo comes within the effective range of a continuous noise source, such as a target, i.e. ship, sufficient to result in operation of the amplitude gate relay 50 is the steering definitely committed to signal control only.

Although a specific embodiment of the invention has been shown and described, it will be understood that it is but illustrative and that various modifications may be made therein without departing from the scope and spirit of this invention as defined in the appended claims.

What is claimed is:

1. A steering system for a torpedo, comprising a rudder, actuating means for deflecting said rudder, gyroscope means for controlling said actuating means and normally associated therewith, signal responsive means for controlling said actuating means and normally dissociated therefrom, said signal responsive means including a pair of signal channels, a pair of hydrophones mounted on opposite sides of the torpedo and each connected to the input end of a respective signal channel, means for combining the outputs of said channels in difference relation to produce a control signal and means for controlling said actuating means in accordance with the polarity of said control signal, transfer means for associating said signal responsive means with said actuating means and dissociating said gyroscope means therefrom subsequent to the launching of the torpedo, means for establishing substantial balance between said channels prior to operation of said transfer means comprising a pair of resistors having a high temperature coefficient of resistance and each included in a respective one of said channels, individual heating means for said resistors and means for controlling said heating means in accordance with the polarity of said control signal, and means for automatically disabling said heating means at a time subsequent to the launching of the torpedo.

2. A steering system for a torpedo, comprising a rudder, actuating means for deflecting said rudder, gyroscope means for controlling said actuating means and normally associated therewith, signal responsive means for controlling said actuating means and normally dissociated therefrom, said signal responsive means including a pair of signal channels, a pair of hydrophones mounted on opposite sides of the torpedo and each connected to the input end of a respective signal channel, means for combining the outputs of said channels in difference relation to produce a control signal and relay means having a pair of contacts and actuated in accordance with said control signal to close one or the other of said contacts in accordance with the polarity of said signal, transfer means for associating said signal responsive means with said actuating means, gate means for effecting operation of said transfer means, means for establishing substantial balance between said channels comprising a pair of resistors having a high temperature coefficient of resistance and each included in a respective signal channel adjacent the input end thereof, individual heater elements for said resistors and energizing circuits for said heater elements each including a respective one of said contacts, and means for opening said energizing circuits at a time subsequent to launching of the torpedo.

3. A steering system for a torpedo comprising a rudder, actuating means for deflecting said rudder, gyroscope means for controlling said actuating means and normally associated therewith, signal responsive means for controlling said actuating means and normally dissociated therefrom, said signal responsive means including a pair of signal channels, a pair of hydrophones mounted on opposite sides of the torpedo and each connected to the input end of a respective signal channel, means for combining the outputs of said channels in difference relation to produce a control signal and means for controlling said actuating means in accordance with the polarity of said control signal, transfer means for associating said signal responsive means with said actuating means and dissociating said gyroscope means therefrom subsequent to the launching of the torpedo, means for establishing substantial balance between said channels prior to operation of said transfer means comprising a pair of resistors having a high temperature coefficient of resistance and each included in a respective one of said channels and means for heating said resistors relatively proportionately to unbalance between said channels, and means for automatically disabling said heating means at a time subsequent to the launching of the torpedo.

4. A steering system for a torpedo, comprising a rudder, actuating means for deflecting said rudder, gyroscope means for controlling said actuating means and normally associated therewith, signal responsive means for controlling said actuating means and normally dissociated therefrom, said signal responsive means including a pair of signal channels, a pair of hydrophones mounted on opposite sides of the torpedo and each connected to the input end of a respective signal channel, means for combining the outputs of said channels in difference relation to produce a control signal and means for controlling said actuating means in accordance with the polarity of said control signal, transfer means for associating said signal responsive means with said actuating means and dissociating said gyroscope means therefrom, gate means including means energized in accordance with signals received by said hydrophones for effecting operation of said transfer means, means for preventing operation of said transfer means until a prescribed time subsequent to the launching of the torpedo, means for establishing substantial balance between said channels including a pair of resistors having a high temperature coefficient of resistance and each included in a respective one of said channels and means for varying the relative temperatures of said resistors proportionately to unbalance between said channels, and means for disabling said temperature varying means at a preassigned time after launching of the torpedo.

5. A control circuit comprising a pair of similar signal channels, means for supplying said channels in common with signals emanating from a source, a pair of resistors having a high temperature coefficient of resistance and each included in a respective channel adjacent the input end thereof, means for combining the outputs of said channels in difference relation to produce a control signal, means controlled in accordance with the polarity of said control signal, means for adjusting said resistors to compensate for such unbalances as may exist between said channels, said adjusting means including means controlled by said controlled means for varying the relative temperatures of said resistors, and means for disabling said temperature varying means.

6. A control circuit comprising a pair of similar signal channels, means for supplying said channels in common with signals emanating from a source, a pair of resistors having a high temperature coefficient of resistance and each included in a respective channel adjacent the input end thereof, means for combining the outputs of said channels in difference relation to produce a control signal, means for substantially balancing said channels including individual heater means for said resistors and means for energizing one or the other of said heater means in accordance with the polarity of said control signal, and means for disabling said energizing means.

7. A control circuit comprising a pair of similar signal channels, means for supplying said channels in common with signals emanating from a source, means for combining the outputs of said channels in difference relation to produce a control signal, a relay having a pair of contacts and an armature normally engaging one of said contacts and disengaged from the other contact, means for energizing said relay in accordance with the polarity of said control signal to transfer said armature from engagement with said one contact to engagement with said other contact when said control signal is of one polarity and to return said armature into engagement with said one contact when said control signal is of the opposite polarity, a load element controllable by said relay and normally dissociated therefrom, means for establishing substantial balance between said channels including a pair of resistors having a high temperature coefficient of resistance and each included in a respective channel adjacent the input end thereof, individual heater elements for said resistors and respective energizing circuits for said heater elements each including said armature and a respective one of said contacts, and means for associating said load element with said relay and disabling said energizing circuits.

No references cited.